(12) United States Patent
Gopalakrishnan et al.

(10) Patent No.: US 7,797,720 B2
(45) Date of Patent: Sep. 14, 2010

(54) ADVANCED TRICK MODE

(75) Inventors: Palamalai Gopalakrishnan, Seattle, WA (US); Christopher G. Knowlton, Redmond, WA (US); Bret P. O'Rourke, Kirkland, WA (US); Ravi Raman, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 994 days.

(21) Appl. No.: 10/970,938

(22) Filed: Oct. 22, 2004

(65) Prior Publication Data

US 2006/0090009 A1    Apr. 27, 2006

(51) Int. Cl.
*H04N 7/173* (2006.01)
(52) U.S. Cl. .......................... 725/88; 725/94
(58) Field of Classification Search ............ 725/88, 725/94
See application file for complete search history.

(56) References Cited

U.S. PATENT DOCUMENTS

| | | | |
|---|---|---|---|
| 5,377,051 A | 12/1994 | Lane et al. | |
| 5,594,491 A | 1/1997 | Hodge et al. | |
| 5,724,646 A | 3/1998 | Ganek et al. | |
| 5,864,682 A * | 1/1999 | Porter et al. | 709/247 |
| 5,917,482 A * | 6/1999 | Putnam | 715/748 |
| 5,933,567 A | 8/1999 | Lane et al. | |
| 6,005,599 A * | 12/1999 | Asai et al. | 725/116 |
| 6,064,794 A | 5/2000 | McLaren et al. | |
| 6,065,050 A | 5/2000 | DeMoney | |
| 6,701,528 B1 | 3/2004 | Arsenault et al. | |
| 7,023,924 B1 | 4/2006 | Keller et al. | |
| 7,054,911 B1 * | 5/2006 | Lango et al. | 709/213 |
| 7,295,608 B2 * | 11/2007 | Reynolds et al. | 375/240.01 |
| 2002/0087994 A1 | 7/2002 | Gomez | |
| 2002/0184637 A1 | 12/2002 | Perlman | |
| 2003/0149975 A1 | 8/2003 | Eldering et al. | |
| 2006/0171658 A1 * | 8/2006 | Jochemsen et al. | 386/46 |
| 2007/0044010 A1 * | 2/2007 | Sull et al. | 715/500.1 |

* cited by examiner

*Primary Examiner*—Joseph P Hirl
*Assistant Examiner*—Jivka Rabovianski
(74) *Attorney, Agent, or Firm*—Lee & Hayes, PLLC

(57) ABSTRACT

An implementation of trick mode methodology receives a first request to stream media for presentation at a first normal playback rate; streams a first media stream configured to the first normal playback rate; receives a second request to stream the media for presentation at a second greater playback rate; and performs one of the following responsive to receiving the second request: switching from streaming the first media stream to streaming from an appropriate position in a second media stream that corresponds to the second greater playback rate; or in an event that a second media stream corresponding to the second greater playback rate is not available, then streaming the first media stream at a higher bit rate in an attempt to comply with the second request.

24 Claims, 4 Drawing Sheets

ADVANCED TRICK MODE

TECHNICAL FIELD

Media streaming systems and methods utilizing trick modes in conjunction with video-on-demand are described herein.

BACKGROUND

Some media systems can allow users to request video-on-demand presentations, such as movies or video clip from a web-site. Many users expect to be able to control the video on demand much as they can control their DVD player. For example, some users want to be able to fast-forward or rewind at one or more speeds. Existing technologies require additional bandwidth to achieve such data delivery to the user. For example, for a fast-forward play request some existing technologies send the same data stream but at a faster bit rate.

Satisfying user demands for fast-forward and/or rewind capability while reducing network bandwidth requirements can be advantageous.

SUMMARY

Advanced trick modes are described herein. In one implementation, a system includes an upstream component configured to stream media to a downstream component. The downstream component is configured to present media to a user. For instance the downstream component may present a movie on a screen for the user. The upstream component is configured to stream a first media stream to the downstream component for presentation at a first playback rate in response to user input. Upon request for a faster playback rate the upstream component is configured to switch from the first media stream to a rate-appropriate point in a second media stream configured for presentation at the faster playback rate. In at least some embodiments, the system can function without the downstream component recognizing a media stream switch.

DETAILED DESCRIPTION

Overview

Figure 1:
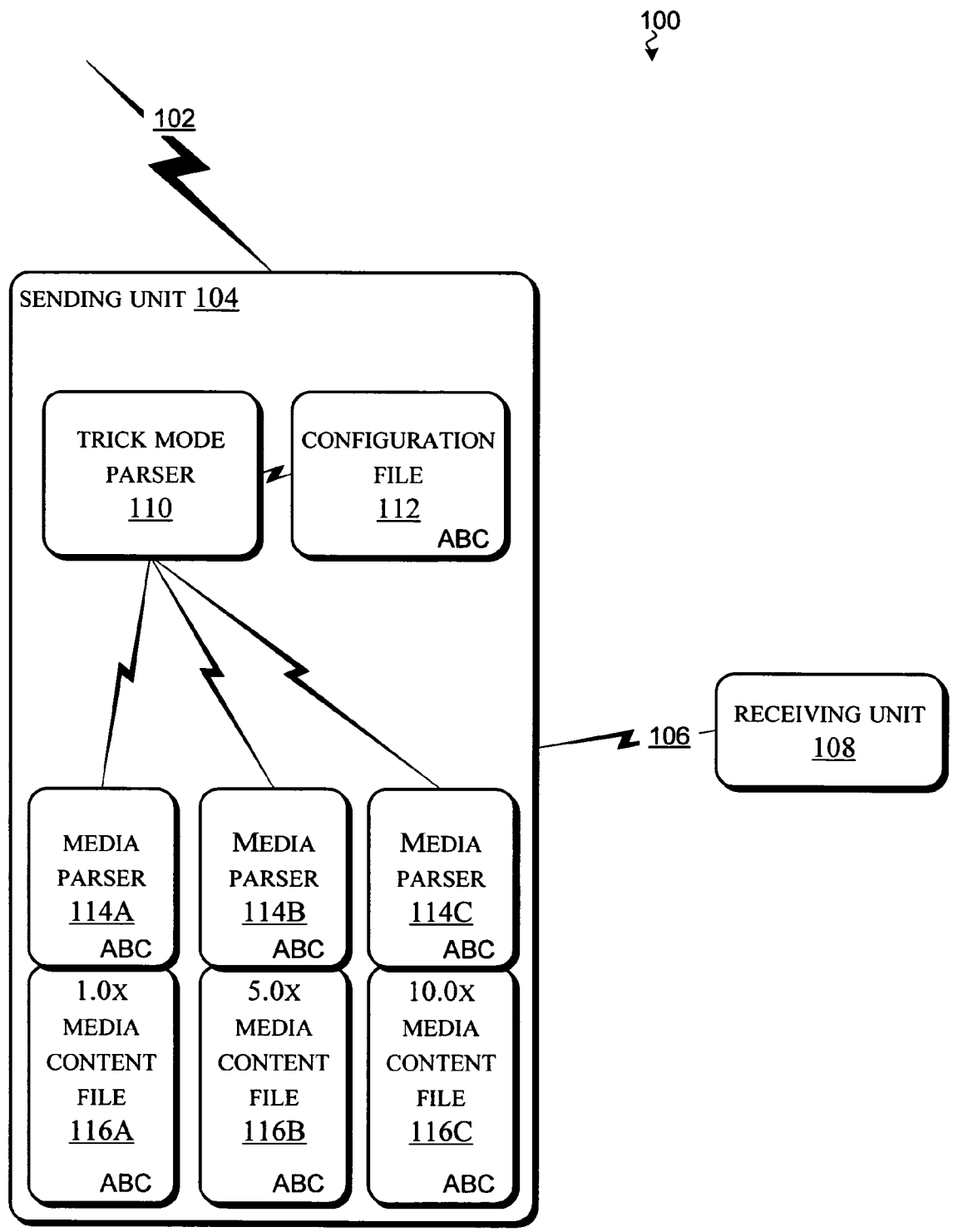
FIG. 1 illustrates a representation of a system in which exemplary trick mode embodiments can be implemented.

The methods and systems described below relate to multimedia streaming techniques. In at least some embodiments, a user or client can select an item located on a network for presentation to the user. The item can be a movie, a film-clip from a web-site or any other multimedia data that can be presented to a user. For purposes of explanation, the term movie will be referred to below with the understanding that the examples and descriptions also apply to other streamable items. The terms "stream" and "streaming" are used herein as terms of art with the recognition that these streams may comprise individual data packets.

In at least some embodiments, the system can access multiple media files associated with the user's movie selection. One of the files can be a normal playback file which is configured for presentation at a normal playback rate from the beginning of the movie to the end of the movie. The normal playback rate meaning the rate that the movie would be played if the user placed a commercially produced DVD of the movie in a DVD player and pushed play on the DVD player.

In some implementations, other individual media files may also relate to the movie from beginning to end, but may contain different total amounts of data when compared to the normal playback file. Those media files which contain lesser amounts of data relative to the normal playback file can be time compressed to play at some relative fraction of the presentation time of the normal playback file.

In response to a user request to play the movie, a first media stream is streamed from a first file for presentation to the user. In but one example, the first file can comprise the normal playback file. The first media file can be streamed at a first average bit rate. In the event that the user subsequently makes a fast-forward or rewind request related to the selected movie, a second media stream can be substituted for the first media stream at an appropriate position corresponding to the last data of the first media stream.

In some implementations, the second media stream can be streamed from a second file which contains less data than the first media file. If the second media stream is streamed and presented at generally the same average bit rate as the first media stream, then the movie is presented at a faster rate than when the movie is presented from the first media stream. Stated another way, the second media file has less data than the normal playback media file and, as such, is time compressed when streamed and presented at the normal playback rate. For example, the second media stream may be obtained from a media file that has one fifth of the data as the normal playback file yet has a profile which is the same or similar to the normal playback file with the exception of the play duration. The second media file and its media stream may be designated according to its relative presentation rate compared to the normal playback rate—in this instance 5.0x. In some implementations, various adjustments may be made to the second media stream such that the client unit and the user are unaware of the existence of more than one media stream. Many of the described systems and methods can be utilized with various data formats and network configurations.

System Topology

The following discussion is directed to systems and methods for streaming media for presentation to a user. While features of the described systems and methods can be implemented in any number of different computing environments, they are described in the context of the following exemplary implementations.

FIG. 1 illustrates a high level representation of exemplary media-stream network topology 100 in which the techniques, systems, and other aspects described herein may be implemented (partially or wholly).

Topology 100 can allow a user engaging a client unit (designated below) to select a movie, for presentation. The user can engage the client unit to request presentation of the movie by the client unit. For example, the client may request a normal "play" or "playback" of a hypothetical movie "ABC".

A user may subsequently request to fast-forward or rewind the presentation. As will be described below, fast forward and rewind rates can be measured as a multiple of the normal playback rate, e.g. 20x, 50x.

Topology 100 can comprise a network 102, sending unit 104, transmission means 106 and a client unit or receiving unit 108. Sending unit 104 can contain and/or be in communication with a trick mode parser 110, a configuration file 112, one or more media parsers 114A-114C and one or more multimedia content files 116A-116C.

Sending unit 104, such as a media server, is communicatively coupled to client unit 108 via transmission means 106. In some implementations sending unit 104 can comprise a general purpose media server configured for use on various types of network configurations. Alternatively or additionally the sending unit may be configured to handle multiple types of media formats such as Windows Media® format, MPEG and AVI among others.

Client unit 108 can comprise any suitable device that is capable of presenting media to a user such as, without limitation, a personal computer (PC), cell-phone, set-top box, and the like. In some embodiments, client unit 108 further comprises a display screen and one or more speakers. In other embodiments client unit 108 is configured to be coupled to a display screen and/or speakers. Transmission means 106 can comprise any suitable transmission means such as Ethernet, broadband, dial-up and wireless.

Sending unit 104 can store sources such as files for transmission to client unit 108 and/or can access the files via network 102. The functionality of the sending unit can be realized by a single component or multiple components. In various embodiments, network 102 may be a limited access network or can comprise the internet, among other configurations.

Sending unit 104 can comprise and/or access trick mode parser 110 and configuration file 112, as well as one or more media parsers 114A-114c and one or more media files 116A-116C. In some configurations, the trick mode parser functionality is achieved as a plug-n-play component or sub-component added to the sending unit.

In this instance configuration file 112, media parsers 114A-114C and media files 116A-116C contain data for use in connection with processing and presenting user selected movie ABC. Media files 116A-116C may be located at the sending unit 104 as illustrated in FIG. 1 and/or may be accessed by sending unit 104 over network 102. Configuration file 112 contains information regarding the media files 116A-116C, their properties, such as their relative playback rate, and their location. The configuration file can be structured in any suitable format. For example, one type of configuration file may be structured in an XML-like fashion as follows:

```
<?tmi version="1.0"?>
<tmi>
  <media src="file://C:\wmpub\WMRoot\ABC_1x.wmv"   rate="1"/>
  <media src="file://C:\wmpub\WMRoot\ABC_5x.wmv"   rate="5"/>
</tmi>
  <media src="file://C:\wmpub\WMRoot\ABC_10x.wmv"  rate="10"/>
</tmi>
```

Media parsers 114A-114C are associated with the media files and are configured to access the data contained therein. In this particular configuration, individual media parsers are associated with individual media files. For example, media parser 114A is associated with media file 116A. Other configurations may have a single media parser associated with multiple media files. For example, in relation to the configuration of FIG. 1, a single media parser could be associated with media files 116A-116C rather than the one-to-one relationship described above.

The media files contain data or media from movie ABC at various presentation rates expressed relative to a normal playback or 1.0x file. In this instance, media file 116A contains an ABC 1.0x file, media file 116B contains the ABC 5.0x file, and media file 116C contains an ABC 10.0x file. In this implementation each of the media files 116A-116C is configured to present movie ABC from beginning to end, but the media files contain different amounts of data as will be explained in more detail below.

While three media files having playback rates of 1.0x, 5.0x and 10.0x are described in this example, the skilled artisan should recognize that is but one embodiment. For example, other embodiments may have more or less media files e.g. from two to any number "n". Further, the relative playback rates can be varied as desired. For example, one embodiment may comprise a 1.0x, 10.0x, 20.0x and 100.0x media files.

The sending unit 104 receives the client's request to view a presentation, in this example to view a presentation of movie ABC. The sending unit may receive the client request directly from the client unit 108. Alternatively, the sending unit may receive the client request from another network component that is not specifically illustrated. For example, the client request may be received by a web-server and passed to the sending unit where the sending unit comprises a media server.

Upon receipt of a client request to play the movie ABC, sending unit 104 will access movie ABC's configuration file 112. In this particular implementation, the sending unit's trick mode parser 110 accesses and interprets the configuration file 112 for movie ABC.

Responsive to the user's play request, sending unit 104 accesses the 1.0x ABC media file 116A and causes data to be streamed from the media file to client unit 108. In this particular implementation this functionality is achieved by the trick mode parser 110. In some embodiments, the trick mode parser 110 causes the data to be streamed from the media file by creating a media parser for the media file. The media parser then accesses and streams the media file's data. Furthermore, the trick mode parser may examine the other ABC media files 116B and 116C. If these media files do not yet have an associated media parser, the trick mode parser may create such media parsers.

In some configurations, trick mode parser 110 can be configured to work with multiple data formats. For example, media content files 116A-116C relating to movie ABC may, for example, be in Windows Media® format (wmv/wma), while media content files relating to a movie DEF may be in JPEG format and media content files relating to movie GHI may be in MPEG II format.

With some content formats, the trick mode parser and/or the appropriate media parser may undertake additional steps consistent with accessing and streaming data from the media files. For example, for Windows Media® format files the parsers may create a data container containing the file and from which the data is streamed.

The media files 116A-116C can be created utilizing various techniques. Often the media files are created in advance by a third party, such as a third party who manages content on network 100. Various programs are commercially available to access a source file and create the various associated media files. In just one such example, Adobe Premier Pro® can be utilized to access an un-coded source file and create source files at different desired relative playback speeds. Each of the source files can then be encoded. In another example, a compressed normal playback source file, i.e. 1.0x, can be accessed by an encoder such as Windows Media® encoder which then creates the other desired files from the 1.0x file.

In some implementations, each of the media files associated with movie ABC can be configured to be streamed along transmission means 106 at a predetermined average bit rate. In but one such example, media files 116A-116C can be configured to be streamed at 1 Mega bit per second. Alternatively or additionally, each of the media files may be configured to be received and buffered by sending unit 104 from network 102 at a predetermined bit rate. Such implementations can allow more efficient allocation of bandwidth capacities within the system. These media files will be discussed in more detail below in relation to FIG. 2.

One technique for achieving the same or generally equivalent bit rate for each of the media files is to remove some of the data or frames from the movie. For example, in some implementations the faster playback files may have all non key frames removed. In the present instance, the 5.0x and 10.0x media files may be comprised exclusively of key or I frames which are stand-alone frames which do not rely on information from adjacent frames. The skilled artisan should recognize other suitable techniques for removing data from the 5.0x and 10.0x files.

Media Files and Data Streaming from the Media Files

Figure 2:
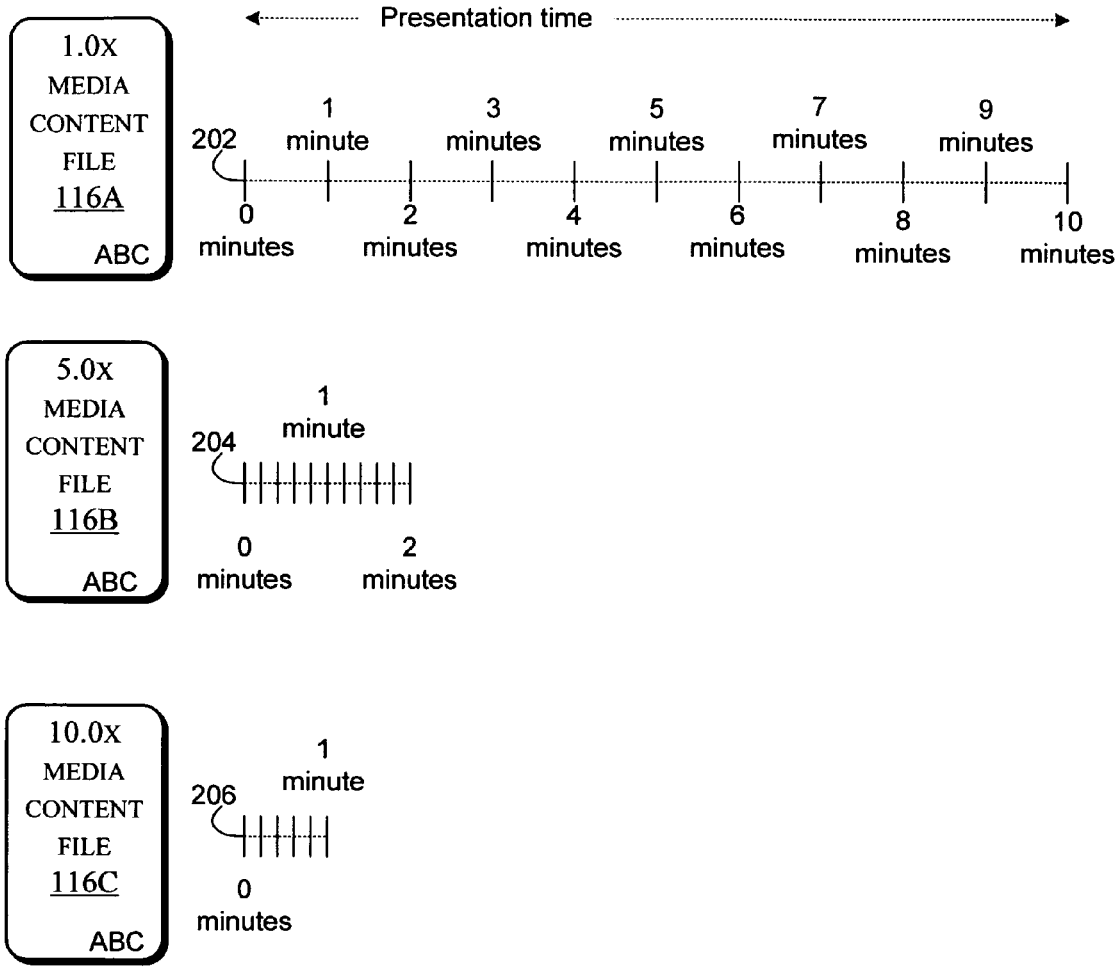
FIG. 2 illustrates a linear representation of data associated with components of an exemplary trick mode system.
Figure 3:
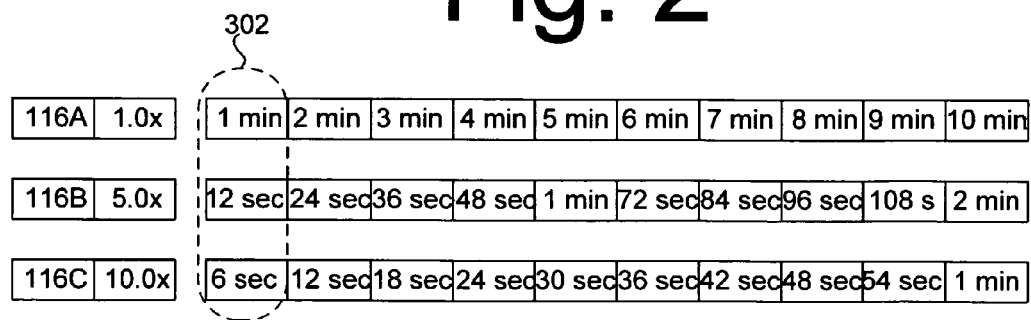
FIG. 3 illustrates a data table configured for use with one trick mode embodiment.

FIGS. 2-3 illustrate the relative presentation times of media files 116A-116C. As described above each of the media files 116A-116C contain movie ABC from start to finish. However, media files 116B and 116C contain less data than media file 116A by a factor of 5 and 10 respectively. As such, these files have shorter relative presentation times when presented at the same average bit rate.

FIG. 2 illustrates a linear representation of media files 116A-116C expressed in the context of presentation time. In this example, and as indicated generally at 202, movie ABC as contained in media file 116A has a 10 minute presentation time at normal or 1.0x playback speed. Media file 116B at 5.0x has a two minute presentation time as indicated generally at 204, and media file 116C has a one minute presentation time as indicated generally at 206. Stated another way, the presentation times of each of the data packets in the nx files can be compressed by a factor of n where n>1. In but one example, presentation time information may be stored in a header of individual data packets comprising a media stream.

FIG. 3 illustrates a representation of a data table which reflects these relative presentation rates of media files 116A-116C. For example, as indicated generally at 302, a point in the movie that occurs 1 minute into the presentation at 1.0x occurs at 12 seconds into the 5.0x file and 6 seconds into the 10.0x file. These relative relationships can be utilized in the methods described below.

Exemplary Methods

Figure 4:
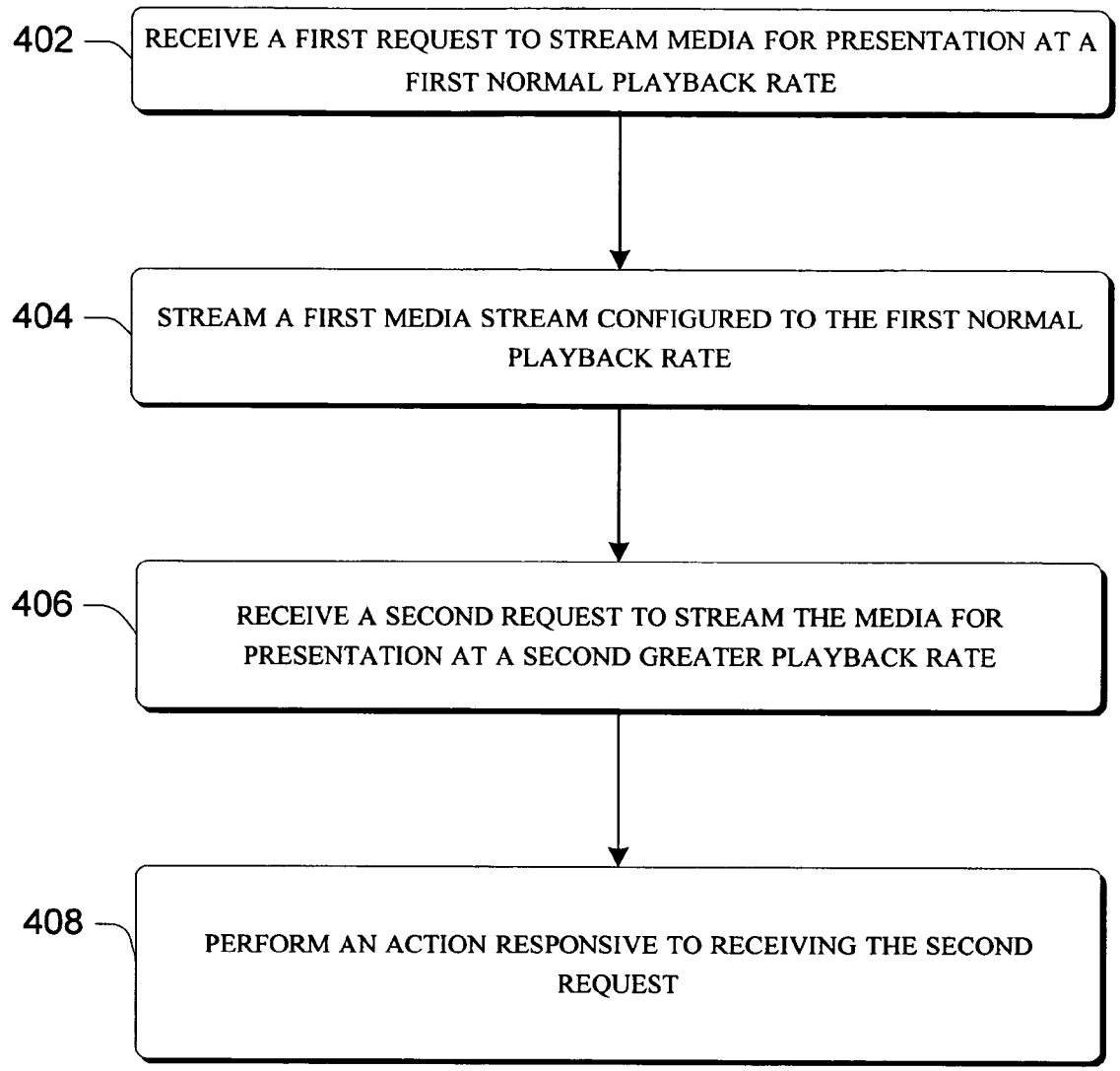
FIG. 4 is a flow diagram that illustrates an exemplary trick mode embodiment.

FIG. 4 represents a flow diagram of acts in accordance with one trick mode implementation. The acts described below can be implemented in connection with any suitable hardware, software, firmware or combination thereof. Exemplary systems are described above and below.

Act 402 receives a first request to stream media for presentation at a first normal playback rate. In some implementations, the method can locate a first media file corresponding to the play request so that corresponding data from the media file can be streamed to the user. In one such example where the first request is to play a movie, such as movie ABC, the method identifies media files associated with movie ABC. The method may access a configuration file for movie ABC which identifies the corresponding media files and various properties such as relative playback rates and locations of the media files.

Act 404 streams a first media stream configured to the first normal playback rate. The media can be streamed from the first media file configured for streaming at a bit rate which allows presentation at the first normal playback rate.

Act 406 receives a second request to stream the media for presentation at a second greater playback rate. Such a request may comprise a user selection to fast-forward or rewind the movie at a given relative rate, i.e. 5.0x, 10.0x, 50.0x, 100.0x etc. The method may attempt to identify a second media file corresponding to the second request. So, for example, if the second request is to fast-forward at 5.0x the method may look for a media file configured for presentation at 5.0x the normal presentation rate. If a corresponding media file is identified, the method may then determine an appropriate position to begin a second media stream from the corresponding media file.

Act 408 performs an action responsive to receiving the second request. The action may comprise switching from streaming the first media stream to streaming the second media stream starting at a rate-appropriate point.

To determine the rate-appropriate point in the second media stream, the method can determine the last presentation time streamed in the first media stream. Alternatively, the client unit may send a desired seek time in the second play request. The method can then, such as by utilizing the reference table described in FIG. 3, identify the corresponding rate-appropriate presentation time of the second media file. For example, if a user is viewing movie ABC at the normal playback rate from the first stream and requests to fast-forward the movie at 5.0x, then the method determines the last streamed presentation time; for instance '5 minutes'. The method can utilize the reference table to identify a corresponding presentation time for the 5.0x file. In this instance the corresponding presentation times are vertically arranged and the corresponding presentation time of the 5.0x media file is 1.0 minute.

The method can begin streaming data from the 5.0x media file from the 1.0 minute point or the next subsequent presentation time. In some embodiments the method may also modify the presentation times of the second media stream so that they chronologically correspond to those of the first media stream. In this particular example, the method can multiply the presentation times of the second media stream by the same multiple or multiplier utilized to describe the files presentation rate relative to the normal playback rate. So in this example the presentation times of the second file can be multiplied by 5.0x so that they chronologically correspond to those of the first media stream. In this example, the first media stream was stopped at 5 minutes and the appropriate position in the second stream was identified from the reference table as 1 minute so the 1 minute presentation time contained in the data of the second file is converted to 5 minutes prior to streaming the data in the second data stream. Each subsequent presentation time of the 5.0x media stream can be similarly altered or adjusted before streaming.

In some implementations this presentation time adjustment is made 'on the fly' as the data is accessed and streamed from the second media file. The skilled artisan should recognize other alternative implementations. For example, the presentation times of the faster playback rates may be adjusted upon formation of the respective media file such that no further adjustment is made when the media file is accessed and its data streamed.

Adjusting the presentation times of the second media stream can allow much of the system to remain unaware of the existence of multiple media files and/or streams. Among other advantages, this can allow the system to work with existing client units which are not configured to operate with multiple streams. In some implementations accessing the various media files and adjusting the second and subsequent media streams to correspond to the first stream can be managed as close to the files as possible to minimize the system components that are configured to handle the multiple streams. In other implementations, the method may have more of this process occurring farther downstream. For example, in some implementations the client unit may be configured to receive the various streams and may make the any adjustments prior to presenting the streams to the user.

In an event that a second media stream corresponding to the requested second greater playback rate is not available, then various exemplary methods may utilize different responses. For example, in one implementation the method may have media files corresponding to 1.0x, 10.0x and 50.0x and be streaming from the 1.0x file when the user requests to fast-forward at 3.0x. In some of these implementations, lacking a 3.0x file, the method may simply continue to stream the current stream and ignore the second client request.

In other implementations the method may attempt to satisfy the client request by sending the current stream at a higher bit rate. For instance, in relation to the example described above, the method may stream the 1.0x media file at 3.0 times the average bit rate to satisfy the client request. Some methods may have further capabilities to attempt to satisfy the user request. For example, in one implementation the method may have media files corresponding to 1.0x, 10.0x and 50.0x and be streaming from the 1.0x media file when the user requests to fast-forward at 20.0x. The system lacks a 20.0x media file so these implementations may switch to streaming appropriate data from the 10.0x media file and may make the adjustments to the presentation times as described above. The method may then stream this data at twice the average bit rate to achieve a 20.0x playback rate.

Other implementations may simply stream from the available media file having the closest value to the second client request. So in the above example where the method has media files corresponding to 1.0x, 10.0x and 50.0x and is streaming from the 1.0x media file when the user requests to fast-forward at 20.0x the method may instead stream from the 10.0x media file.

Other implementations may simply consider the second client request invalid and not satisfy the client's request at all.

Figure 5:
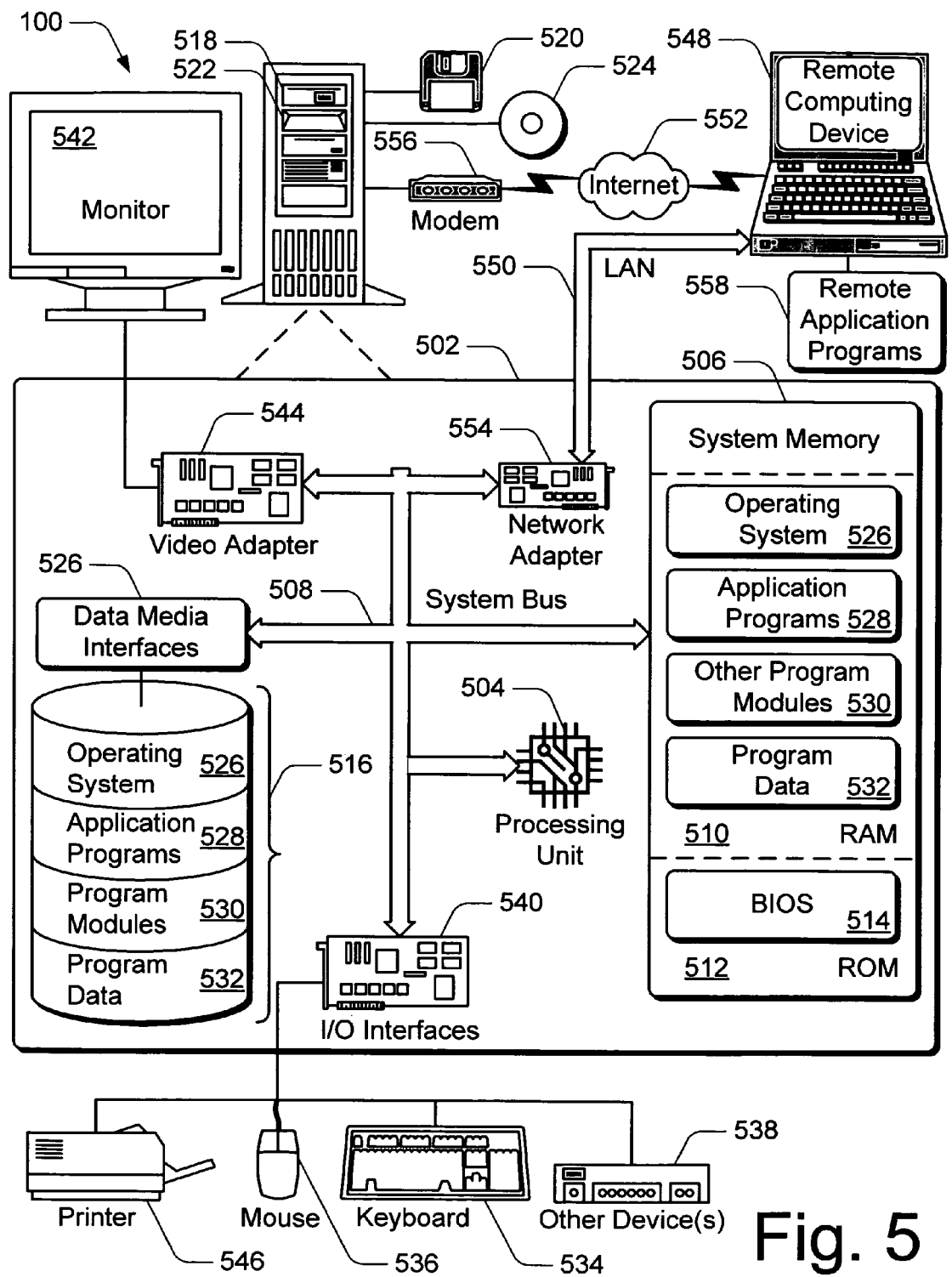
FIG. 5 illustrates exemplary systems, devices, and components in an environment that trick modes can be implemented.

FIG. 5 represents an exemplary system environment 500 upon which advanced trick modes may be implemented. System environment 500 includes a general-purpose computing system in the form of a computing device 502. The components of computing device 502 can include, but are not limited to, one or more processors 504 (e.g., any of microprocessors, controllers, and the like), a system memory 506, and a system bus 508 that couples the various system components. The one or more processors 504 process various computer executable instructions to control the operation of computing device 502 and to communicate with other electronic and computing devices. The system bus 508 represents any number of several types of bus structures, including a memory bus or memory controller, a peripheral bus, an accelerated graphics port, and a processor or local bus using any of a variety of bus architectures.

Computing environment 500 includes a variety of computer readable media which can be any media that is accessible by computing device 502 and includes both volatile and non-volatile media, removable and non-removable media. The system memory 506 includes computer-readable media in the form of volatile memory, such as random access memory (RAM) 510, and/or non-volatile memory, such as read only memory (ROM) 512. A basic input/output system (BIOS) 514 maintains the basic routines that facilitate information transfer between components within computing device 502, such as during start-up, and is stored in ROM 512. RAM 510 typically contains data and/or program modules that are immediately accessible to and/or presently operated on by one or more of the processors 504.

Computing device 502 may include other removable/non-removable, volatile/non-volatile computer storage media. By way of example, a hard disk drive 516 reads from and writes to a non-removable, non-volatile magnetic media (not shown), a magnetic disk drive 518 reads from and writes to a removable, non-volatile magnetic disk 520 (e.g., a "floppy disk"), and an optical disk drive 522 reads from and/or writes to a removable, non-volatile optical disk 524 such as a CD-ROM, digital versatile disk (DVD), or any other type of optical media. In this example, the hard disk drive 516, magnetic disk drive 518, and optical disk drive 522 are each connected to the system bus 508 by one or more data media interfaces 526. The disk drives and associated computer readable media provide non-volatile storage of computer readable instructions, data structures, program modules, and other data for computing device 502.

Any number of program modules can be stored on the hard disk 516, magnetic disk 520, optical disk 524, ROM 512, and/or RAM 510, including by way of example, an operating system 526, one or more application programs 528, other program modules 530, and program data 532. Each of such operating system 526, application programs 528, other program modules 530, and program data 532 (or some combination thereof) may include an embodiment of the systems and methods described herein.

A user can interface with computing device 502 via any number of different input devices such as a keyboard 534 and pointing device 536 (e.g., a "mouse"). Other input devices 538 (not shown specifically) may include a microphone, joystick, game pad, controller, satellite dish, serial port, scanner, and/or the like. These and other input devices are connected to the processors 504 via input/output interfaces 540 that are coupled to the system bus 508, but may be connected by other interface and bus structures, such as a parallel port, game port, and/or a universal serial bus (USB).

A monitor 542 or other type of display device can be connected to the system bus 508 via an interface, such as a video adapter 544. In addition to the monitor 542, other output peripheral devices can include components such as speakers (not shown) and a printer 546 which can be connected to computing device 502 via the input/output interfaces 540.

Computing device 502 can operate in a networked environment using logical connections to one or more remote computers, such as a remote computing device 548. By way of example, the remote computing device 548 can be a personal computer, portable computer, a server, a router, a network computer, a peer device or other common network node, and the like. The remote computing device 548 is illustrated as a portable computer that can include many or all of the elements and features described herein relative to computing device 502.

Logical connections between computing device 502 and the remote computing device 548 are depicted as a local area network (LAN) 550 and a general wide area network (WAN) 552. Such networking environments are commonplace in offices, enterprise-wide computer networks, intranets, and the Internet. When implemented in a LAN networking environment, the computing device 502 is connected to a local network 550 via a network interface or adapter 554. When implemented in a WAN networking environment, the computing device 502 typically includes a modem 556 or other means for establishing communications over the wide area network 552. The modem 556, which can be internal or external to computing device 502, can be connected to the system bus 508 via the input/output interfaces 540 or other appropriate mechanisms. The illustrated network connections are exemplary and other means of establishing communication link(s) between the computing devices 502 and 548 can be utilized.

In a networked environment, such as that illustrated with computing environment 500, program modules depicted relative to the computing device 502, or portions thereof, may be stored in a remote memory storage device. By way of example, remote application programs 558 are maintained with a memory device of remote computing device 548. For purposes of illustration, application programs and other executable program components, such as the operating system 526, are illustrated herein as discrete blocks, although it is recognized that such programs and components reside at various times in different storage components of the computing device 502, and are executed by the processors 504 of the computing device.

Although embodiments relating to advanced trick mode have been described in language specific to structural features and/or methods, it is to be understood that the subject of the appended claims is not necessarily limited to the specific features or methods described. Rather, the specific features and methods are disclosed as exemplary implementations for advanced trick mode.

The invention claimed is:

1. A system, comprising:
   a processor;
   memory;
   a downstream component configured to present multimedia media streams to a user in response to user input;
   an upstream component configured to:
   stream a first media stream from a first media file to the downstream component, the first media stream being received by the downstream component for presentation to the user at a first playback rate; and,
   upon request for a faster playback rate, switch from the first media stream to a rate-appropriate point in a second media stream from a second media file configured for presentation at the faster playback rate,
   wherein a presentation time of the second media stream is modified, chronologically corresponding the presentation time of the second media stream to a presentation time of the first media stream, such that the downstream component and the user are unaware of the existence of more than one media stream, and
   wherein the second media file is streamed by the upstream component at a same bit rate to the first media file, and wherein the second media file is read by the downstream component at a same bit rate to the first media file.

2. A system as recited in claim 1, wherein the first and second media streams contain headers relating to presentation times and wherein the upstream component is configured to alter the presentation times in the second media stream such that the first presentation time of the second media stream chronologically follows the last presentation time of the first media stream.

3. A system as recited in claim 1, wherein each of the first and second media files are configured to be streamed at a predetermined average bit rate.

4. A system as recited in claim 1, wherein the upstream component comprises a media server.

5. A system as recited in claim 1, wherein the upstream component is configured to access a configuration file associated with the user input and wherein the configuration file identifies a location and a relative playback rate of at least two media files associated with the user input.

6. A system as recited in claim 1, wherein the upstream component comprises a trick mode parser configured to access a configuration file associated with the user input and wherein the configuration file identifies a location and relative playback rate of at least two media files associated with the user input.

7. A system as recited in claim 6, wherein the trick mode parser is further configured to access the at least two media files associated with the user input and to cause a media parser to be created for individual media files.

8. A network hardware device, comprising:
   a first component configured to be communicably coupled to a network, the first component being configured to access and stream multiple data formats over the network; and,
   a second component operatively associated with the first component, the second component configured to receive the multiple data formats from the first component and being configured to receive a first client request to stream media data for presentation to a client at a first playback speed and to cause data of a first media stream to be streamed to the client in response to the first client request, the second component further being configured to stream the client-requested media data to the client from an appropriate point in a second different media stream from a second media file having a second greater playback speed corresponding to a second client request,
   wherein the second media stream is streamed by the second component at a same bit rate to the first media stream.

9. A network device as recited in claim 8, wherein the first component comprises a general purpose media server.

10. A network device as recited in claim 8, wherein the second component comprises a plug-n-play software component which is added to the first component.

11. A network device as recited in claim 8, wherein the multiple formats comprise one or more of JPEG, MPEG, and MP3.

12. A network device as recited in claim 8, wherein the data streamed in response to the first client request and the data streamed in response to the second client request are streamed at generally equivalent average bit rates.

13. A network device as recited in claim 8, wherein the first and second data streams contain individual packets of data and wherein individual packets contain information relating to a chronological presentation time of the individual packet relative to an overall presentation time for the data and wherein the component is further configured to begin streaming the second media stream from an appropriate point which chronologically follows the chronological presentation time of the data at the end of the first media stream.

14. A network device as recited in claim 13, wherein the second component is further configured to adjust the chronological presentation times of the second data stream to correspond to the chronological presentation times of the first data stream.

15. A network device as recited in claim 13, wherein the first component is configured for use on multiple types of networks.

16. A network device as recited in claim 13, wherein the second component comprises a sub-component of the first component.

17. A method implemented on a computing device, the method comprising:
- receiving a first request to stream media for presentation at a first normal playback rate;
- streaming a first media stream to a client device, from a first media file, configured to the first normal playback rate;
- receiving a second request to stream the media for presentation at a second greater playback rate; and
- performing one of the following responsive to receiving the second request:
- switching from streaming the first media stream to streaming to the client device from an appropriate position in a second media stream from a second media file that corresponds to the second greater playback rate, wherein the second media stream is streamed at a same bit rate to the first media stream; or
- in an event that a second media stream corresponding to the second greater playback rate is not available, then streaming the first media stream to the client device at a higher bit rate in an attempt to comply with the second request.

18. A method as recited in claim 17, wherein the first and second media streams are streamed at a same average bit rate.

19. A method as recited in claim 17, wherein said streaming comprises accessing a configuration file which identifies a location and a corresponding playback rate of each of multiple versions of a first media file, each of the multiple versions of the first media file having a distinctly different playback rate from the first media file and any other of the multiple versions of the first media file when read at a same bit rate to a bit rate of the first media file.

20. A method as recited in claim 19 further comprising causing a media parser to be created for the multiple versions of the first media file.

21. A method as recited in claim 19 further comprising causing a media parser to be created for each of the multiple versions of the first media file.

22. A method as recited in claim 21, wherein said streaming a first media stream comprises causing an individual media parser associated with a media file having the normal playback rate to stream media from the media file.

23. A method as recited in claim 17, wherein the first media stream comprises a first data format and the second media stream comprises a second different data format.

24. One or more computer readable storage media comprising computer executable instructions that, when executed, direct a computing device to perform the method of claim 17.

* * * * *